United States Patent [19]

Achikita et al.

[11] Patent Number: 5,030,677

[45] Date of Patent: Jul. 9, 1991

[54] COMPOSITION FOR INJECTION MOULDING

[75] Inventors: Masakazu Achikita, Kashiwa City; Akihito Ohtsuka, Sakura City, both of Japan

[73] Assignee: Sumitomo Metal Mining Company Limited, Tokyo, Japan

[21] Appl. No.: 423,232

[22] Filed: Oct. 18, 1989

[30] Foreign Application Priority Data

Oct. 18, 1988 [JP] Japan ..................................... 262052

[51] Int. Cl.[5] ................................................ C08K 5/55

[52] U.S. Cl. .................................... 524/183; 524/405; 524/440; 524/487; 524/586

[58] Field of Search ............... 524/183, 440, 487, 405, 524/586

[56] References Cited

U.S. PATENT DOCUMENTS 3,242,135 3/1966 Bown et al. ...................... 260/45.85

4,144,207 3/1979 Ohnsorg ........................... 260/23 S 4,891,399 1/1990 Ohkawa et al. ..................... 523/200

*Primary Examiner*—Paul R. Michl

*Assistant Examiner*—Edward J. Cain

*Attorney, Agent, or Firm*—Watson, Cole, Grindle and Watson

[57] ABSTRACT

Disclosed is a composition for injection moulding which is composed of a sinterable powder comprising at least one metal or alloy and a binder. The binder contains from 10 to 80% by weight of a low-density polyethylene from 10 to 80% by weight of a paraffin wax and from 5 to 35% by weight of a boric acid ester. The ratio of the sinterable powder to the binder in the composition is from 30 to 70% by volume of the former and from 70 to 30% by volume of the latter. The binder can be removed from the green body to be prepared by injection-moulding the composition unexpectedly rapidly without interfering with the properties of the final product sintered.

6 Claims, No Drawings

COMPOSITION FOR INJECTION MOULDING

FIELD OF THE INVENTION

The present invention relates to a composition for injection moulding, which is employed for producing fine-shaped precision machine parts by injection-moulding a metal or alloy powder and thereafter sintering the resulting green body.

BACKGROUND OF THE INVENTION

In accordance with the conventional powder metallurgy method of producing sintered articles, a metal or alloy powder as a composition to be shaped is press-shaped and then the resulting green body is sintered to form a sintered article. Therefore, it was difficult to produce articles having three-dimensionally complicated shapes, thin articles or articles having a thin part such as a knife edge part by the said method.

In order to overcome the drawback of the above-mentioned method, a different method has been proposed wherein an injection-mouldable composition which is composed of a metal or alloy powder and a binder is injeciton-moulded into a mould having a determined shape and the thus moulded green body is heated to remove the binder therefrom and thereafter sintered to form a metal or alloy-sintered article (Japanese Patent Application Laid-Open Nos. 57-16103 and 57-26105).

Since the method uses a metal or alloy powder having a mean particle size of 10 μm or less, an article having a high sintered density can be obtained. However, the method requires a long period of time for the step of removing the binder from the green body. As a result, the method has an economical disadvantage that the manufacture cost is high.

If a rapidly decomposing binder is employed for the purpose of shortening the time for removing the binder, the shaped green body would be cracked, blistered or deformed in the binder-removing step because of the gas to be caused by decomposition of the binder. As opposed to this, a trial of using a mixture comprising a slow-decomposing binder and a rapidly decomposing binder in a desired proportion has been effected. Even in such trial, however, the binder-removing property of the green body could not be improved.

The improvement of the binder-removing property as referred to herein means that the time necessary for completion of removal of binder is short, the processing temperature for removal of binder may be low, and the green body is free from defects of cracking, blistering, deformation or the like during the binder-removing step.

Under the situtation, the object of the present invention is to provide an injection-mouldable composition for producing precision parts, which comprises a metal or alloy powder as the raw material and which is characterized by the improved binder-removing property. None of the conventional injection-mouldable compositions could have such improved binder-removing property.

SUMMARY OF THE INVENTION

In order to overcome the above-mentioned problems in the prior art, the present inventors tried varying the proportion (by volume) of the metal or alloy powder to the binder in the injection-mouldable composition and varing the proportion (by weight) of the respective components constituting the binder. As a result, they have found a novel injection-mouldable composition which is free from the above-mentioned problems. Specifically, the injection-mouldable composition which is provided by the present invention is composed of a sinterable powder comprising at least one metal or alloy and a binder and is characterized in that the said binder contains from 10 to 80% by weight of a low-density polyethylene, from 10 to 80% by weight of a paraffin wax and from 5 to 35% by weight of a boric acid ester and that the ratio of the said sinterable powder to the said binder is from 30 to 70% by volume of the former to from 70 to 30% by volume of the latter.

DETAILED DESCRIPTION OF THE INVENTION

The sinterable powder for use in the present invention is composed of one or more selected from a pure iron, a stainless steel, a carbonyl iron and a pure cobalt. As the low-density polyethylene and paraffin wax for the binder, a commercial low-density polyethylene product and an ordinary paraffin wax can be employed in the present invention. The boric acid ester for the binder may be one or more selected from triglycol diborates, trialkyl borates, glycerol borates and alkyl diborates. More precisely, the triglycol diborates include, for example, 1,6-bis(5-ethyl-4-propyl-1,3,2-dioxabora-2-cyclohexyloxy)hexane, 1,4-bis(5-ethyl-4-propyl-1,3,2-dioxabora-2-cyclohexyloxy)butane, etc.; the trialkyl borates include, for example, trimethyl borate, triethyl borate, tributyl borate, triamyl borate, etc.; the glycerol borates include, for example, glycerol borate stearate, polyoxyethylene glycerol borate palmitate, etc.; and the alkyl diborates include, for example, methyl diborate, ethyl diborate, etc. Especially preferably, triglycol diborates are mentioned.

The boric acid esters can be employed singly or as a mixture of two or more of them. Where the ester is blended with the other components, it is desired to be dissolved in a solvent such as benzene, toluene or xylene and the resulting solution of approximately 60 to 80 wt. % is incorporated into the other components, whereby the compatibilily between the metal powder and the organic binder is improved further. In this case, therefore, the binder composition is to contain a solvent of a certain amount as an additional component.

The equipment and apparatus to be employed for injection-moulding the composition of the present invention may be any and every equipment and apparatus which are generally employed for injection-moulding conventional plastic matrials. The heating temperature for the process of injection-moulding the composition of the present invention is 80° to 200° C. and the injection pressure is 500 to 2000 kg/cm$^2$.

Where the precision green body as formed from the composition of the present invention by injection-moulding is heated and degassed in the above-mentioned equipment, it may be heated at a temperature of 250° to 300° C. at a temperature-elevating speed of form 12° to 30 ° C./hr whereby removal of the binder from the green body may be finished, whereupon the heating is effected in an inert gas or reducing gas atmosphere for the easily oxidizable powder but is effected in an air or inert gas atmosphere for the hardly oxidizable powder. As opposed to this, a green body as formed from the conventional composition must be heated at a high temperature of 400° to 550° C. at a slow temperature-elevating speed of from 1° to 10° C./hr for the purpose of removing the binder from the body. In accordance with the present invention, such high temperature and low temperature-elevating speed are unnecessary for removing the binder from the green body. Accordingly, the composition of the present invention is noticeably advantageous as being helpful for improving the efficiency in the binder-removing step.

As mentioned above, the injection-mouldable composition of the present invention is first injection-moulded, heated for removal of the binder from the moulded green body and thereafter sintered to obtain a sintered article. In processing the composition of the invention, the binder-removing step may advantageously be effected by heating the green body up to a temperature of 250° to 300° C. at a temperature-elevating speed of approximately from 12° to 30° C./hr in any of the above-mentioned reducing gas atmosphere, aerial atmosphere or inert gas atmosphere, provided that the proportion by weight of the respective components for constituting the binder and the proportion by volume of the sinterable powder to the binder for constituting the composition satisfy the ranges as specifically defined because of the reasons mentioned below. As opposed to this, the binder-removing step for processing the conventional composition is to be effected at a high temperature of 400° to 500° C. at a temperature-elevating speed of from 1° to 10° C. Comparing the condition in the binderremoving step for processing the composition of the present invention and that for processing the conventional composition, the advantageous merit of the present invention is noticeable. The reasons for specifically defining the proportion of the binder components and the proportion of the metallic powder to the binder in the composition are mentioned below. The metal or alloy powder as the powder to be sintered is defined to fall within the range of from 30 to 70% by volume of the composition. This is because if the sinterable powder is less than 30% by volume, the fluidity of the composition would be insufficient in the step of injection-moulding the composition. As a result, not only the injection-moulding operation would be impossible but also the density of the sinterable powder in the moulded green body would be too low, whereby the density of the finally sintered article could hardly be augmented.

On the other hand, if the proportion of the sinterable powder is more than 70% by volume, the strength of the injection-moulded green body would be lowered and the surface of the green body would often have so-called face defects. As a result, the injection-mouldability of the composition is noticeably worsened.

The binder composition contains a low-density polyethylene in an amount of from 10 to 80% by weight. This is because if the content of the low-density polyethylene is less than 10% by weight, the strength and the shape-retentiveness of the moulded green body would be lowered so that the surface of the green body would easily be cracked although the time for removing the binder could be shortened. On the other hand, if the content is more than 80% by weight, the time for removing the binder would unnecessarily be too long.

The binder composition contains a paraffin wax in an amount of from 10 to 80% by weight. This is because if the content of the paraffin wax is less than 10% by weight, the injection-mouldability of the composition would be insufficient so that the binder-removing time would be prolonged and the binder-removing temperature would also be elevated.

If, on the other hand, the content of the paraffin wax is more than 80% by weight, the strength and the shape-retentiveness of the moulded green body would be insufficient so that the subsequent treatment of the green body would often be impossible.

The binder composition further contains a boric acid ester in an amount of from 5 to 35% by weight. This is because the boric acid ester of the definined content has a function of improving the miscibility of the sinterable powder and the binder thereby to improve the uniform dispersibility of the powder in the binder. Additionally, the boric acid ester has another function of improving the density and the dimension stability of the finally sintered article. If the content of the ester is less than 5% by weight, the miscibility of the sinterable powder and the binder could not be improved so that the green body from which the binder has been removed would defectively be porous. If, on the other hand, it is more than 35% by weight, the strength of the moulded green body would be lowered.

In blending the composition, stearic acid may be added thereto in an amount of less than 20% by weight of the composition for the purpose of improving the releasability of the injection-moulded green body from the mould. It was ascertained that such addition do not interfere with the effect of the composition of the present invention.

The following examples are intended to illustrate the present invention in more detail but not to limit it in any way.

EXAMPLES

SUS 630 (17Cr-4Ni-Fe) stainless steel powder having an average particle size of 15 μm, as obtained by an atomizing method, was blended with various binders comprising the components as shown in Table 1 below. From the compositions were prepared sintered articles having sharp edges.

Precisely, the binder as indicated in Table 1 below was blended with the stainless steel pwoder, kneaded and moulded into the form of a gear by injection-moulding, whereupon the injection-mouldability of the composition was checked and mentioned in Table 1.

Next, the thus injection-moulded green body was heated in a nitrogen gas atmosphere so that the binder was removed from the body to the residual binder content of 1% by weight or less, whereupon the removal of the binder was confirmed by measuring the weight of the body before and after the heat-treatment. After the heat-treatment, the outward appearance of the body was observed. The result was shown in Table 1, along with the heating temperature and the heating time for the binder-removing step.

The moulded and heat-treated green body samples which had good outward appearance were picked out from all the samples and then sintered at 1250° C. for 1 hour. As a result, good sintered articles were obtained therefrom. The strength of the thus sintered articles was measured for the test pieces on the basis of the standard as defined by Japan Powder Metallurgical Technology Association and the results obtained were shown in Table 2 below, where the numerical value indicates the average of five test data.

In Conventional Example 1, a good moulded green body was obtained, but the injection-moulding pressure was too high and the binder-removing property was bad.

In Conventional Example 2, the binder-removing temperautre was low and the binder-removing time was short as the composition contained a large amount of paraffin wax. However, a part of the green body deformed after the step of removing the binder therefrom.

In Conventional Example 3, the dimension contraction of the moulded green body was large, the binder-removing temperature was high and the binder-removing time was long. In addition, the moulded green body was cracked.

Comparative Examples 1 to 6 demonstrate the compositions where the proportion of the binder components or the ratio of the sinterable powder to the binder is outside the scope of the present invention. Precisely, Comparative Examples 1 and 2 demonstrate the compositions where the proportion of the binder components falls within the scope of the present invention while the ratio of the sinterable powder to the binder is outside the scope of the present invention. Comparative Examples 3 to 6 demonstrate the compositions where the proportion of the binder components falls outside the scope of the present invnetion while the ratio of the sinterable powder to the binder falls within the scope of the present invention. The problem of the sample of Comparative Example 1 is that the moulded green body partly deformed. The problem of the sample of Comparative Example 2 is that the composition could not be moulded. The problem of the sample of Comparative Example 3 is that the strength of the green body was low and the body deformed. The problem of the sample of Comparative Example 4 is that the binder-removing temperature was high and the binder-removing time was long though the shapability of the composition was good and the outward appearance of the moulded green body was good. The problem of the sample of Comparative Example 5 is that the green body deformed. The problem of the sample of Comparative Example 6 is that the binder separated from the other components in the composition and the moulded green body was porous. As opposed to these samples of Conventional Examples and Comparative Examples, the samples of Examples 1 to 5 of the present ivenntion showed good results with respect to both the shapability and the outward appearance of the moulded green body, even though the binder-removing time was short to be 16 to 26 hours and the binder-removing temperature was low to be 250° to 280° C.

TABLE 1

| Sample No. | Binder: Components (wt. %) | Binder: Proportion (vol. %) | Injection-Mouldability | Binder-removing Property: Temperature | Binder-removing Property: Time | Binder-removing Property: Outward Appearance |
|---|---|---|---|---|---|---|
| Conventional Example | | | | | | |
| 1 | Low-molecular polypropylene (60)<br>Partially saponified montan wax (15)<br>Dibutyl phthalate (25) | 44 | Moulding pressure was high. | 500° C. | 70 hr | Good. |
| 2 | Paraffin wax (90)<br>Polyethylene (fluidity 50) (5)<br>Ethylene Acryalte (3)<br>Mineral oil agent (2) | 38 | Strength of moulded green body was low. | 300° C. | 24 hr | Partly deformed. |
| 3 | Partially saponified montan wax (70)<br>Polyethylene (fluidity 200) (20)<br>Stearic acid (10) | 34 | Dimension contraction was noticeable. | 500° C. | 70 hr | Cracked. |
| Comparative Example | | | | | | |
| 1 | Paraffin wax (60)<br>Polyethylene (fluidity 200) (20)<br>Boric acid ester dispersing agent (20) | 75 | Good. | 300° C. | 24 hr | Partly deformed. |
| 2 | Paraffin wax (60)<br>Polyethylene (fluidity 200) (20)<br>Boric acid ester dispersing agent (20) | 27 | Unmouldable. | | | |
| 3 | Paraffin wax (83)<br>Polyethylene (fluidity 200) (11)<br>Boric acid ester-dispersing agent (6) | 34 | Strength of moulded green body was low. | 250° C. | 16 hr | Deformed. |
| 4 | Paraffin wax (11)<br>Polyethylene (fluidity 200) (83)<br>Boric acid ester dispersing agent (6) | 44 | Good. | 450° C. | 58 hr | Good. |
| 5 | Paraffin wax (30)<br>Polyethylene (fluidity 200) (30)<br>Boric acid ester dispersing agent (40) | 40 | Strength of moulded green body was low. | 250° C. | 16 hr | Deformed. |
| 6 | Paraffin wax (70)<br>Polyethylene (fluidity 200) (27)<br>Boric acid ester dispersing agent (3) | 36 | Binder separated. | 250° C. | 16 hr | Porous. |
| Example of the Invention | | | | | | |
| 1 | Paraffin wax (60)<br>Polyethylene (fluidity 200) (20)<br>Boric acid ester dispersing agent (20) | 34 | Good. | 250° C. | 16 hr | Good. |
| 2 | Paraffin wax (40)<br>Polyethylene (fluidity 200) (40)<br>Boric acid ester dispersing agent (20) | 40 | Good. | 280° C. | 24 hr | Good. |
| 3 | Paraffin wax (50)<br>Polyethylene (fluidity 200) (40)<br>Boric acid ester dispersing agent (10) | 43 | Good. | 250° C. | 26 hr | Good. |
| 4 | Paraffin wax (70)<br>Polyethylene (fluidity 200) (20)<br>Boric acid ester dispersing agent (10) | 39 | Good. | 250° C. | 16 hr | Good. |
| 5 | Paraffin wax (60)<br>Polyethylene (fluidity 200) (20) | 32 | Good. | 250° C. | 16 hr | Good. |

TABLE 1-continued

| Sample No. | Binder Components (wt. %) | Binder Proportion (vol. %) | Injection-Mouldability | Binder-removing Property Temperature | Time | Outward Appearance |
|---|---|---|---|---|---|---|
| | Boric acid ester dispersing agent (15) Stearic acid (5) | | | | | |

TABLE 2

| Sample No. | Mechanical Strength of Sintered Article Tensile Strength (kg/mm²) | Elongation (%) |
|---|---|---|
| Conventional Example 1 | 115 | 13.2 |
| Comparative Example 4 | 114 | 13.9 |
| Example of the Invention | | |
| 1 | 120 | 13.5 |
| 2 | 121 | 12.9 |
| 3 | 123 | 12.6 |
| 4 | 119 | 13.6 |
| 5 | 118 | 13.9 |

Table 3 below indicates the mechanical strength of sintered articles of other various examples.

TABLE 3

| Name of Powder to be Sindered | Average Particle Size | Preparation Method | Sintering Condition | Mechanical Strength of Sintered Article Tensile Strength (kg/mm²) | Elongation (%) |
|---|---|---|---|---|---|
| SUS316L | 15 μm | Gas-atomized powder | 1350° C. × 2 hr | 96.3 | 68.4 |
| Pure ion | 5 μm | Carbonyl powder | 1350° C. × 2 hr | 24.7 | 15.8 |
| Fe-0.5P | 5 μm | Carbonyl iron powder | 1300° C. × 1 hr | 36.8 | 35.1 |
| | −300 mesh | 27P-Fe ground powder | | | |
| 50Co—Fe | 5 μm | Carbonyl iron powder | 1350° C. × 2 hr | 136.5 | 3.0 |
| | 4.5 μm | Reduced Co powder | | | |
| Fe-2Ni | 5 μm | Carbonyl iron powder | 1300° C. × 1 hr | 43.0 | 33.4 |
| | 5 μm | Carbonyl nickel powder | | | |
| Pure Co | 4.5 μm | Reduced Co powder | 1350° C. × 2 hr | 46.0 | 28.0 |

In the samples of Table 3 above, the binder composition comprised 60% by weight of paraffin wax, 20% by weight of polyethylene and 20% by weight of boric acid ester dispersing agent.

The injection-moulded green body samples of Table 3 above were heated at 250° ° C. for 16 hours for removing the binder therefrom and the outward appearance of the thus heat-treated body samples were all good.

The composition of the present invention is especially effective and useful for injection moulding, which is obvious from the results shown in Table 4 below. Table 4 demonstrates the mechanical strength of the sintered articles prepared from only the sinterable powder having the same composition as that used in Table 3 above. Precisely, only the sinterable powder was compression-moulded by a general powder metallurgical method and then sintered to obtain the sintered article of Table 4. It is understood that the mechanical strength of the sintered articles in Table 4 is lower than that of the sintered articles in Table 3.

TABLE 4

| Name of Powder to be Sindered | Average Particle Size | Preparation Method | Sintering Condition | Mechanical Strength of Sintered Article Tensile Strength (kg/mm²) | Elongation (%) |
|---|---|---|---|---|---|
| SUS316L | 15 μm | Gas-atomized powder | 1350° C. × 2 hr | 63.1 | 58.2 |
| Pure ion | 5 μm | Carbonyl powder | 1350° C. × 2 hr | 16.2 | 14.0 |
| Fe-0.5P | 5 μm | Carbonyl iron powder | 1300° C. × 1 hr | 35.0 | 30.1 |
| | −300 mesh | 27P-Fe ground powder | | | |
| 50Co—Fe | 5 μm | Carbonyl iron powder | 1350° C. × 2 hr | 124.5 | 2.0 |
| | 4.5 μm | Reduced Co powder | | | |
| Fe-2Ni | 5 μm | Carbonyl iron powder | 1300° C. × 1 hr | 41.2 | 29.4 |
| | 5 μm | Carbonyl nickel powder | | | |
| Pure Co | 4.5 μm | Reduced Co powder | 1350° C. × 2 hr | 42.1 | 19.0 |

In accordance with the present invention, the processing time necessary for the step of removing the binder from the injection-moulded green compact as prepared from a sinterable metal alloy powder and binder noticeably be shortened with imparting no bad influence to the properties of the final products. Accordingly, thin parts having a complicated shape may stably and inexpensively be provided by powder-metallurgical injection-moulding by the present invention. The present invention thus noticeably contributes to the development of the precision industry.

While the invention has been described in detail and with reference to specific embodiments thereof, it will be apparent to one skilled in the art that various changes and modifications can be made therein without departing from the spirit and scope thereof.

What is claimed is:

1. A composition for injection moulding which is composed of a sinterable powder comprising at least one metal or alloy and a binder and which is characterized in that the said binder contains from 10 to 80% by weight of a low-density polyethylene, from 10 to 80% by weight of a paraffin wax and from 5 to 35% by weight of a boric acid ester and that the ratio of the said sinterable powder to the said binder is from 30 to 70% by volume of the former and from 70 to 30% by volume of the latter.

2. The composition as claimed in claim 1, in which the said sinterable powder is a powder of at least one selected from pure iron, stainless steel, carbonyl iron and pure cobalt.

3. The composition as claimed in claim 1, in which the said boric acid ester is at least one selected from triglycol diborates, trialkyl borates, glycerol borates and alkyl diborates.

4. The composition as claimed in claim 3, in which the said boric acid ester is incorporated into the composition as a solution of from 60 to 80% by weight of the ester dissolved in a solvent.

5. The composition as claimed in claim 4, in which the said solvent is one selected from benzens, toluene and xylene.

6. A method of forming a molded metallic product which comprises the steps of:

(a) providing a composition comprising 30 to 70% by volume of a sinterable powder and 70 to 30% by volume of a binder, said sinterable powder comprising at least one metal or alloy and said binder comprising 10 to 80% by weight of low-density polyethylene, 10 to 80% by weight of paraffin wax and 5 to 35% by weight of a boric acid ester;

(b) injecting said composition in a mold so as to form a molded green body;

(c) heating the molded green body at a rate of 12° to 30° C./hr up to 250° to 300° C. so as to remove said binder from said molded green body and form a molded metallic product, and (d) recovering said molded metallic product.

* * * * *